US012722077B2

(12) United States Patent
Lu et al.

(10) Patent No.: US 12,722,077 B2
(45) Date of Patent: Sep. 1, 2026

(54) CONTROL HANDLE

(71) Applicant: DEXIN CORPORATION, New Taipei City (TW)

(72) Inventors: Ho-Lung Lu, New Taipei City (TW); Yi-Chen Liu, New Taipei City (TW)

(73) Assignee: DEXIN CORPORATION, New Taipei City (TW)

( * ) Notice: Subject to any disclaimer, the term of this patent is extended or adjusted under 35 U.S.C. 154(b) by 169 days.

(21) Appl. No.: 18/919,697

(22) Filed: Oct. 18, 2024

(65) Prior Publication Data

US 2026/0014456 A1 Jan. 15, 2026

(30) Foreign Application Priority Data

Jul. 9, 2024 (TW) ................................ 113125568

(51) Int. Cl.
*A63F 13/24* (2014.01)
*A63F 13/235* (2014.01)

(52) U.S. Cl.
CPC ............ *A63F 13/24* (2014.09); *A63F 13/235* (2014.09)

(58) Field of Classification Search
None
See application file for complete search history.

(56) References Cited

U.S. PATENT DOCUMENTS

2017/0361223 A1* 12/2017 Gohara .................. A63F 13/24
2019/0262702 A1* 8/2019 Fujita ...................... A63F 13/98
2022/0323857 A1* 10/2022 Khaira .................... A63F 13/92
2022/0339533 A1* 10/2022 Schoenith .............. A63F 13/24
2025/0099848 A1* 3/2025 Yeo ......................... A63F 13/24

* cited by examiner

*Primary Examiner* — Jason T Yen
(74) *Attorney, Agent, or Firm* — Li & Cai Intellectual Property (USA) Office

(57) ABSTRACT

A control handle includes two gripping parts, a connecting structure, a detecting module, and a processing module. The two gripping parts are engaged with each other through the connecting structure, thereby being operable to move closer to or away from each other. When the detecting module determines that the two gripping parts are engaged with each other, an engaging signal is generated. The processing module enters a sleep mode when receiving engaging signal. When in the sleep mode and a specific button is pressed, the processing module is operated to control a communication module to search for a connecting host nearby. When the processing module uses the detecting module to determine that the two gripping parts are separated from each other, and the portable electronic device and the connector are connected, the processing module can be connected to the portable electronic device through the communication module.

10 Claims, 4 Drawing Sheets

1
11A
11C
33
3
32
11
16
15
13
23
22
2
21
11B
11
100
1

CONTROL HANDLE

CROSS-REFERENCE TO RELATED PATENT APPLICATION

This application claims the benefit of priority to Taiwan Patent Application No. 113125568, filed on Jul. 9, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control handle, and more particularly to a control handle having two gripping parts that can be moved relative to each other.

BACKGROUND OF THE DISCLOSURE

A conventional control handle (e.g., a game handle) designed for mobile phones can only be connected to mobile phones and cannot be used with game consoles (e.g., XBOX, PlayStation, etc.) in general, causing inconvenience for users.

SUMMARY OF THE DISCLOSURE

In response to the above-referenced technical inadequacy, the present disclosure provides a control handle for effectively improving the issues associated with a conventional control handle that is only capable of connecting to mobile phones and not to common game consoles.

In order to solve the above-mentioned problems, one of the technical aspects adopted by the present disclosure is to provide a control handle. The control handle includes two gripping parts, a connecting structure, at least one detecting module, a connector, at least one battery, and a processing module. The two gripping parts each include a plurality of operating members. Each of the operating members is operable by a user. The two gripping parts are grippable by the user. When each of the operating members is pressed, an operating signal is generated correspondingly. One of the operating members is a wireless connecting button. The two gripping parts and two ends of the connecting structure are connected to each other, and the two gripping parts are configured to move closer to or away from each other through the connecting structure. The at least one detecting module is disposed in one of the two gripping parts. The at least one detecting module is configured to detect whether the two gripping parts is engaged with each other. When the at least one detecting module determines that the two gripping parts are engaged with each other, the at least one detecting module generates an engaging signal. The connector is disposed in one of the two gripping parts, and the connector is configured to insert into a connector of a portable electronic device. The at least one battery is disposed in at least one of the two gripping parts. The processing module is electrically connected to the at least one detecting module, the connector, and the at least one battery. When the processing module receives the engaging signal, the processing module is switched to a combine state. In the combine state, the processing module is operated to enter a sleep mode. In the combine state, when the wireless connecting button or a start button is pressed, the processing module is operated to control a communication module to search whether there is a connecting host nearby. After a communication connection between the communication module and the connecting host is established, the processing module is operated to transmit the operating signal to the connecting host through the communication module. When the processing module determines that the connector and the connector of the portable electronic device are plugged into each other, the processing module is switched to a separate state. In the separate state, the processing module is operated to turn off a power supply of the battery, a power for an operation of the control handle is provided from the portable electronic device, and the processing module transmits the operation signal to the portable electronic device through the connector.

Therefore, in the control handle of the present disclosure, the control handle can detect whether the two gripping parts are engaged or separated from each other through the arrangement of the detecting module, such that the processing module can transmit the operating signal to the portable electronic device through the connector when the two gripping parts are separated from each other and the connector is connected to the portable electronic device. When the two gripping parts are engaged with each other, the processing module is connected to the connecting host nearby through the communication module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
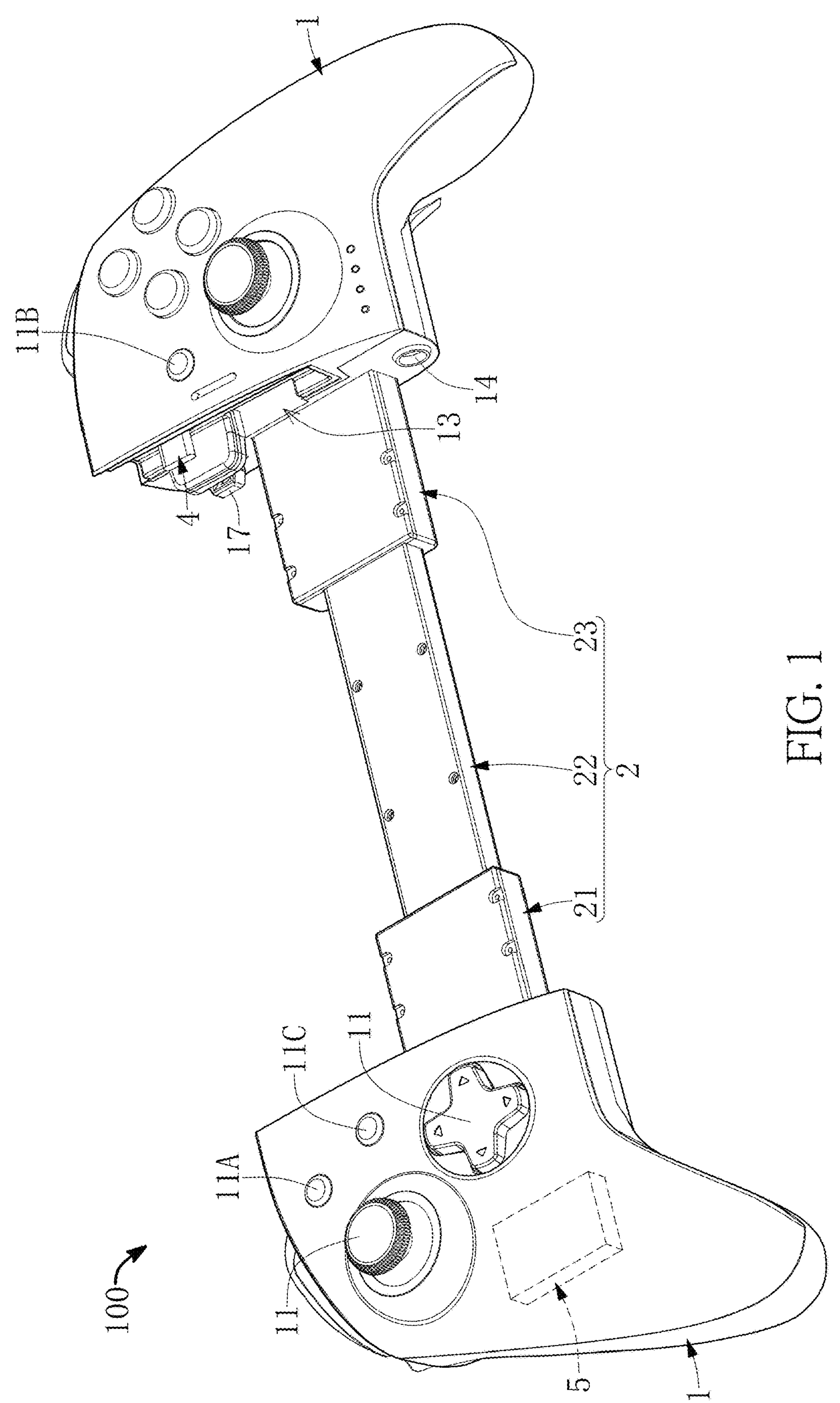
FIG. 1 is a schematic view of a control handle according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
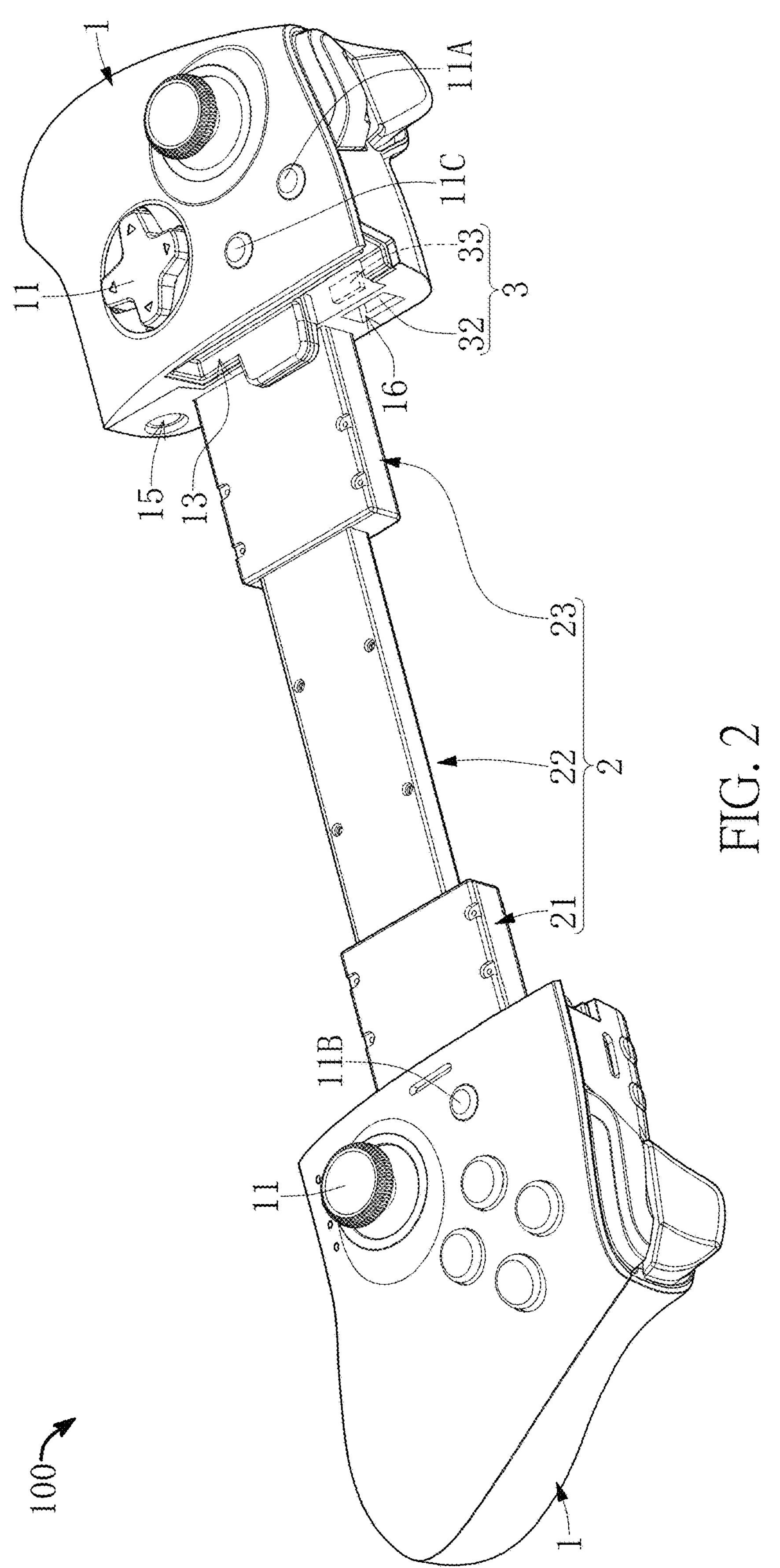
FIG. 2 is a schematic view of the control handle from another perspective of FIG. 1.
Figure 3:
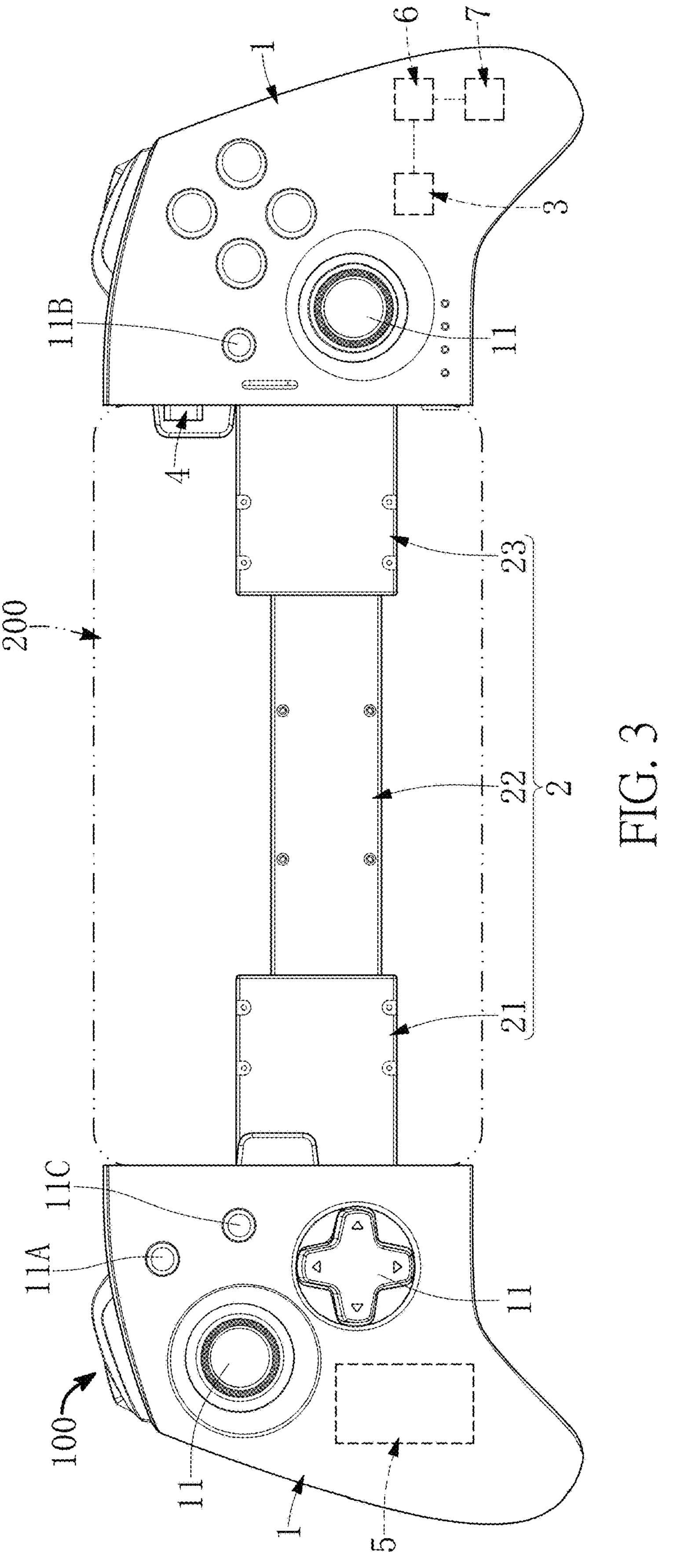
FIG. 3 is a schematic view of the control handle being installed on a portable electronic device according to one embodiment of the present disclosure.
Figure 4:
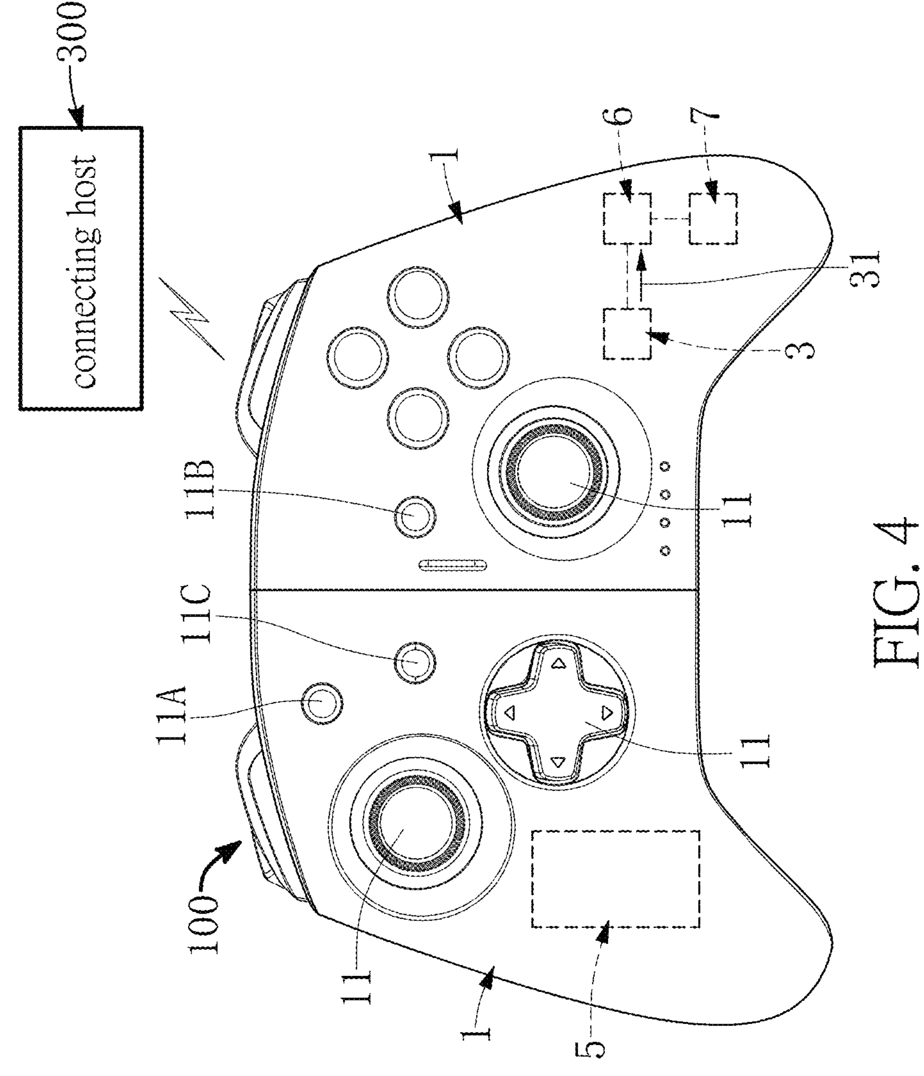
FIG. 4 is a schematic view showing the two gripping parts of the control handle engaged with each other according to one embodiment of the present disclosure.

Referring to FIG. 1 to FIG. 4, FIG. 1 is a schematic view of a control handle according to the present disclosure, FIG. 2 is a schematic view of the control handle from another perspective of FIG. 1, FIG. 3 is a schematic view of the control handle being installed on a portable electronic device according to one embodiment of the present disclosure, and FIG. 4 is a schematic view showing the two gripping parts of the control handle engaged with each other according to one embodiment of the present disclosure.

A control handle 100 includes two gripping parts 1, a connecting structure 2, a detecting module 3, a connector 4, a battery 5, and a processing module 6. A quantity of the detecting module 3 or the battery 5 included in the control handle 100 is not limited to one. In other embodiments of the present disclosure, the control handle 100 can also include at least two detecting modules 3 or at least two batteries 5.

The two gripping parts 1 each include a plurality of operating members 11, and each of the operating members 11 is operable by a user. The two gripping parts 1 are grippable by the user. When each of the operating members 11 is pressed, an operating signal is generated correspondingly. One of the operating members 11 is a wireless connecting button 11A. In practice, a part of the operating members 11 can be a button, and another part of the operating members 11 can be a stick.

The two gripping parts 1 and two ends of the connecting structure 2 are connected to each other. The two gripping parts 1 are configured to move closer to or away from each other through the connecting structure 2. For example, the connecting structure 2 can include a left sliding member 21, a middle sliding member 22, and a right sliding member 23. Two ends of the left sliding member 21 are respectively connected to one of the two gripping parts 1 and one end of the middle sliding member 22. Another end of the middle sliding member 22 is connected to one end of the right sliding member 23, and another one end of the right sliding member 23 is connected to another one of the gripping parts 1. The left sliding member 21, the middle sliding member 22, and the right sliding member 23 are slidable relative to each other. An interior of each of the two gripping parts 1 has an accommodating space for accommodating the left sliding member 21, the middle sliding member 22, and the right sliding member 23.

In practice, the connecting structure 2 can include a spring. When the two gripping parts 1 are moved away from each other, the spring can be stretched to generate an elastic restoring force. Accordingly, when the user places the portable electronic device 200 (e.g., a mobile phone or a tablet computer) in a position between the gripping parts 1, the elastic restoring force of the spring enables the two gripping parts 1 to stably clamp the portable electronic device 200.

The detecting module 3 is disposed in one of the two gripping parts 1. The detecting module 3 is configured to detect whether the two gripping parts 1 are engaged with each other. When the detecting module 3 determines that the two gripping parts 1 are engaged with each other, the detecting module 3 generates an engaging signal 31.

As shown in FIG. 1 and FIG. 2, in one of embodiments, the detecting module 3 includes a light emitter 32, a light receiver 33, and a processor (not shown in the drawings). One side of one of the two gripping parts 1 that faces toward another one of the two gripping parts 1 has an inserting groove 16. The light emitter 32 and the light receiver 33 are located around the inserting groove 16, and the another one of the two gripping parts 1 has a photo-interrupter structure 17. When the two gripping parts 1 are engaged with each other, the photo-interrupter structure 17 is correspondingly located in the inserting groove 16, the photo-interrupter structure 17 is located between the light emitter 32 and the light receiver 33 to block a light beam that is emitted from the light emitter 32 to the light receiver 33, and the processor of the detecting module 3 is operated to correspondingly generate the engaging signal 31.

In one of the embodiments, the detecting module 3 can include a plurality of metal contacts and a sensing circuit. A part of the metal contacts is disposed on an inner side of one of the two gripping parts 1, and another part of the metal contacts is disposed on an inner side of another one of the two gripping parts 1. When the two gripping parts 1 are engaged with each other, the metal contacts respectively disposed on the two gripping parts 1 are in contact with each other, and the sensing circuit is operated to correspondingly generate the engaging signal 31.

In one of the embodiments, the detecting module 3 can include a magnet and a magnetic sensor. The magnet and the magnetic sensor are respectively disposed on the inner sides of the two gripping parts 1. When the two gripping parts 1 are engaged with each other, the magnet can be close to the magnetic sensor, and the magnetic sensor correspondingly generates the engagement signal 31 upon sensing an approach of the magnet.

In one of the embodiments, the detecting module 3 can include a micro switch that is disposed on the inner side of one of the two gripping parts 1. When the two gripping parts 1 are engaged with each other, the inner side of another one of the two gripping parts 1 presses the micro switch, and the micro switch is operated to correspondingly generate the engaging signal 31.

In one of the embodiments, the detecting module 3 can include a pressure sensor that is disposed on the inner side of one of the two gripping parts 1, and another one of the two gripping parts 1 has a pressing portion corresponding in position to the pressure sensor. When the two gripping parts 1 are engaged with each other, the pressing portion presses the micro switch, and the micro switch is operated to correspondingly generate the engaging signal 31.

As shown in FIG. 1 and FIG. 3, the connector 4 is disposed in one of the two gripping parts 1, and the connector 4 is configured to insert into a connector (not shown in the drawings) of the portable electronic device 200. For example, the connector 4 can be a Micro USB connector, a Type-C USB connector, etc. The connector 4 can be changed according to the connector of the portable electronic device 200.

The battery 5 is disposed in at least one of the two gripping parts 1. In practice, the control handle 100 can also include two batteries 5, and the two batteries 5 can be disposed in the two gripping parts 1. The processing module 6 is electrically connected to the detecting module 3, the connector 4, and the two batteries 5.

As shown in FIG. 1 to FIG. 3, after the user moves the two gripping parts 1 in a direction away from each other, the user can arrange the portable electronic device 200 at a position between the two gripping parts 1 and plug the connector of the portable electronic device 200 and the connectors 4 of the two gripping parts 1 into each other. After the connector of the portable electronic device 200 and the connector 4 of the two gripping parts 1 are plugged into each other, the spring (not shown in the drawings) in the connecting structure 2 is stretched, such that the portable electronic device 200 is held by the two gripping parts 1.

When the processing module 6 determines that the connector 4 and the connector of the portable electronic device 200 are plugged into each other, the processing module 6 is switched to a separate state. In the separate state, the processing module 6 is operated to turn off a power supply of the battery 5, a power for an operation of the control handle 100 is provided from the portable electronic device 200, and the processing module 6 transmits the operation signal to the portable electronic device 200 through the connector 4. It is worth mentioning that, in the separate state, the processing module 6 is operated to not use the portable electronic device 200 to charge the battery 5, thereby avoiding consuming power from the portable electronic device 200.

As shown in FIG. 1 and FIG. 2, in a preferred embodiment, the inner side of each of the two gripping parts 1 has an accommodating groove 13, the accommodating grooves 13 of the two gripping parts 1 are configured to accommodate two sides of the portable electronic device 200, and the connector 4 is arranged in one of the accommodating grooves 13. When the portable electronic device 200 is installed between the two gripping parts 1, the two sides of the portable electronic device 200 are accommodated in the two accommodating grooves 13, thereby allowing the portable electronic device 200 to be better held by the two gripping parts 1.

As shown in FIG. 4, when the two gripping parts 1 are engaged with each other, the processing module 6 receives the engaging signal 31, and then the processing module 6 is switched to a combine state. In the combine state, the processing module 6 is operated to enter a sleep mode. In the sleep mode, the processing module 6 is operated to only retain the power for the operation of the detection circuit that is used to detect whether the wireless connection button 11A and a start button 11B are pressed.

In the combine state, when the wireless connection button 11A or the start button 11B are pressed, the processing module 6 is awakened and exits the sleep mode, and the processing module 6 is operated to control a communication module 7 to search whether there is a connecting host 300 nearby. For example, the connecting host 300 can be a computer, a laptop, a tablet, or various game consoles (e.g., XBOX, PlayStation, etc.). After a communication connection between the communication module 7 and the connecting host 300 is established, the processing module 6 is operated to transmit the operating signal to the connecting host 300 through the communication module 7.

In more detail, the two gripping parts 1 being engaged with each other may indicate that the user is ready to put away the control handle 100. Therefore, when processing module 6 receives the engaging signal 31, the processing module 6 can first enter the sleep mode. If the user still wants to use the control handle 100 after the two gripping parts 1 are engaged with each other, the processing module 6 can search whether there is the connecting host 300 nearby when the user presses the wireless connecting button 11A or the start button 11B, and can try to connect the control handle 100 to the connecting host 300 nearby.

In practice, in one of the preferred embodiments, one of the operating members 11 can be a wireless communication switch button 11C. For example, the communication module 7 can include a Bluetooth communication module and a 2.4 GHz wireless communication module.

When the two gripping parts 1 are engaged with each other and the wireless connecting button 11A or the start button 11B are pressed, the processing module 6 can use the 2.4 GHz wireless communication module to scan whether the connecting host 300 that is previously paired is present in the vicinity, and if the connecting host 300 that is previously paired is present, the control handle 100 is connected to the connecting host 300.

When the two gripping parts 1 are engaged with each other and the wireless communication switch button 11C is pressed, the processing module 6 can use the Bluetooth communication module to scan and connect the portable electronic device 200 or the connecting host 300 nearby.

When the processing module 6 determines that the connector 4 has been connected to the connector of the portable electronic device 200, the processing module 6 can be switched to the Bluetooth communication module for scanning nearby Bluetooth devices (i.e., the portable electronic device 200), so as to connect to the portable electronic device 200 via Bluetooth. It is worth mentioning that, in the separate state, when the wireless connecting button 11A is pressed, the processing module 6 does not control the communication module 7 to search for the connecting host 300 nearby.

As shown in FIG. 1 and FIG. 2, in the preferred embodiment, one of the two gripping parts 1 has a first engaging structure 14, and another one of the two gripping parts 1 has a second engaging structure 15. The first engaging structure 14 and the second engaging structure 15 are engageable with each other for enabling the two gripping parts 1 to abut against each other. In practice, for example, one of the first engaging structure 14 and the second engaging structure 15 can be a protruding structure, and another one of the first engaging structure 14 and the second engaging structure 15 can be a groove, and the first engaging structure 14 and the second engaging structure 15 can be engaged with each other in a tight-fitting or tight-fitting-like manner. Therefore, the two gripping parts 1 can be better engaged with each other through the design of the first engaging structure 14 and the second engaging structure 15, thereby preventing the two gripping parts 1 from abruptly separating from each other during use.

Beneficial Effects of the Embodiments

In the control handle of the present disclosure, the control handle allows the user to separate or engage the two gripping parts with each other according to practical requirements. When the two gripping parts are separated from each other, the user can install the portable electronic device at the position between the two gripping parts, and can connect the connector of the portable electronic device to the connector of the control handle, thereby enabling the user can to control the portable electronic device using the control handle. In contrast, the user can engage the two gripping parts with each other and press the start button or the wireless connecting button to connect the control handle to the connecting host nearby.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A control handle, comprising:

two gripping parts each including a plurality of operating members, each of the operating members being operable by a user, the two gripping parts being grippable by the user, wherein, when each of the operating members is pressed, an operating signal is generated correspondingly, and one of the operating members is a wireless connecting button;

a connecting structure, wherein the two gripping parts and two ends of the connecting structure are connected to each other, and the two gripping parts are configured to move closer to or away from each other through the connecting structure;

at least one detecting module being disposed in one of the two gripping parts and being configured to detect whether the two gripping parts are engaged with each other, wherein, when the at least one detecting module determines that the two gripping parts are engaged with each other, the at least one detecting module generates an engaging signal;

a connector being disposed in one of the two gripping parts and being configured to insert into a connector of a portable electronic device;

at least one battery disposed in at least one of the two gripping parts; and a processing module electrically connected to the at least one detecting module, the connector, and the at least one battery;

wherein, when the processing module receives the engaging signal, the processing module is switched to a combined state, and wherein, in the combine state, the processing module is operated to enter a sleep mode;

wherein, in the combine state, when the wireless connecting button or a start button is pressed, the processing module is operated to control a communication module to search whether there is a connecting host nearby, and wherein, after a communication connection between the communication module and the connecting host is established, the processing module is operated to transmit the operating signal to the connecting host through the communication module; and wherein, when the processing module determines that the connector and the connector of the portable electronic device are plugged into each other, the processing module is switched to a separated state; wherein, in the separate state, the processing module is operated to turn off a power supply of the at least one battery, power for an operation of the control handle is provided from the portable electronic device, and the processing module transmits the operation signal to the portable electronic device through the connector.

2. The control handle according to claim 1, wherein, in the separate state, the processing module is operated to not use the portable electronic device to charge the at least one battery.

3. The control handle according to claim 1, wherein an inner side of each of the two gripping parts has an accommodating groove, the accommodating grooves of the two gripping parts are configured to accommodate two sides of the portable electronic device, and the connector is arranged in one of the accommodating grooves.

4. The control handle according to claim 1, wherein one of the two gripping parts has a first engaging structure, and another one of the two gripping parts has a second engaging structure, and wherein the first engaging structure and the second engaging structure are engageable with each other for enabling the two gripping parts to abut against each other.

5. The control handle according to claim 1, wherein the at least one detecting module includes a light emitter, a light receiver, and a processor, one side of one of the two gripping parts that faces toward another one of the two gripping parts has an inserting groove, the light emitter and the light receiver are located around the inserting groove, and the another one of the two gripping parts has a photo-interrupter structure; and wherein, when the two gripping parts are engaged with each other, the photo-interrupter structure is correspondingly located in the inserting groove, the photo-interrupter structure is located between the light emitter and the light receiver to block a light beam that is emitted from the light emitter to the light receiver, and the processor is operated to correspondingly generate the engaging signal.

6. The control handle according to claim 1, wherein the at least one detecting module includes a plurality of metal contacts and a sensing circuit, a part of the metal contacts is disposed on an inner side of one of the two gripping parts, another part of the metal contacts is disposed on an inner side of another one of the two gripping parts; and wherein, when the two gripping parts are engaged with each other, the metal contacts respectively disposed on the two gripping parts are in contact with each other, and the sensing circuit is operated to correspondingly generate the engaging signal.

7. The control handle according to claim 1, wherein the at least one detecting module includes a magnet and a magnetic sensor, and the magnet and the magnetic sensor are respectively disposed on inner sides of the two gripping parts.

8. The control handle according to claim 1, wherein the at least one detecting module includes a micro switch that is disposed on an inner side of one of the two gripping parts; and wherein, when the two gripping parts are engaged with each other, an inner side of another one of the two gripping parts presses the micro switch, and the micro switch is operated to correspondingly generate the engaging signal.

9. The control handle according to claim 1, wherein the at least one detecting module includes a pressure sensor that is disposed on an inner side of one of the two gripping parts, and another one of the two gripping parts has a pressing portion corresponding in position to the pressure sensor; and wherein, when the two gripping parts are engaged with each other, the pressing portion presses the micro switch, and the micro switch is operated to correspondingly generate the engaging signal.

10. The control handle according to claim 1, wherein, in the separate state, when the wireless connecting button is pressed, the processing module does not control the communication module to search for the connecting host nearby.

* * * * *